US009552521B2

(12) United States Patent
Chen et al.

(10) Patent No.: US 9,552,521 B2
(45) Date of Patent: Jan. 24, 2017

(54) HUMAN BODY SECURITY INSPECTION METHOD AND SYSTEM

(71) Applicants: TSINGHUA UNIVERSITY, Beijing (CN); NUCTECH COMPANY LIMITED, Beijing (CN)

(72) Inventors: Zhiqiang Chen, Beijing (CN); Yuanjing Li, Beijing (CN); Ziran Zhao, Beijing (CN); Wanlong Wu, Beijing (CN); Yingkang Jin, Beijing (CN); Yinong Liu, Beijing (CN); Wenguo Liu, Beijing (CN); Xianli Ding, Beijing (CN); Bin Sang, Beijing (CN); Le Tang, Beijing (CN); Ming Ruan, Beijing (CN); Chenguang Zhu, Beijing (CN); Liaohua Fu, Beijing (CN); Fuhua Ding, Beijing (CN); Shuo Cao, Beijing (CN)

(73) Assignees: Tsinghua University, Beijing (CN); Nuctech Company Limited, Beijing (CN)

( * ) Notice: Subject to any disclaimer, the term of this patent is extended or adjusted under 35 U.S.C. 154(b) by 151 days.

(21) Appl. No.: 14/337,190

(22) Filed: Jul. 21, 2014

(65) Prior Publication Data

US 2015/0030205 A1    Jan. 29, 2015

(30) Foreign Application Priority Data

Jul. 23, 2013 (CN) .......................... 2013 1 0311555

(51) Int. Cl.
*G06K 9/00* (2006.01)
*G06T 7/00* (2006.01)
*G07C 9/00* (2006.01)

(52) U.S. Cl.
CPC ....... *G06K 9/00771* (2013.01); *G06K 9/00362* (2013.01); *G06T 7/0002* (2013.01);
(Continued)

(58) Field of Classification Search
CPC ............ G06K 9/00362; G06K 9/00369; G06K 9/00771; G06K 2209/09; G06T 7/0002; G06T 2207/30196; G06T 2207/30232; H04N 5/272; H04N 2005/2726
See application file for complete search history.

(56) References Cited

U.S. PATENT DOCUMENTS

| 2006/0104480 | A1* | 5/2006 | Fleisher | 382/103 |
|---|---|---|---|---|
| 2006/0262902 | A1* | 11/2006 | Wattenburg | 378/57 |
| 2007/0235652 | A1* | 10/2007 | Smith | 250/363.02 |

(Continued)

FOREIGN PATENT DOCUMENTS

| CN | 102565110 A | 7/2012 |
|---|---|---|
| CN | 102608672 A | 7/2012 |
| WO | WO 2012/119216 A1 | 9/2012 |

OTHER PUBLICATIONS

He et al.; "Interval estimation and sample size calculation for ATR algorithm classification accuracy"; Systems Engineering and Electronics; vol. 29 No. 7; Jul. 2007; contains Abstract; p. 1021-1026.

(Continued)

*Primary Examiner* — Andrew W Johns
(74) *Attorney, Agent, or Firm* — Baker & Hostetler LLP

(57) ABSTRACT

The present invention provides a human body security inspection method and system. The method comprises: retrieving in real-time scanning row or column image data of a personal to be inspected; transmitting in real-time the image data to an algorithm processing module and processing these image data by the module; automatically recognizing a suspicious matter by a suspicious matter automatic target recognition technique, after retrieving an image data of an entire scanning image of the personal; any of the following three inspection modes is selected, so as to perform a further processing on basis of the recognition result of the suspicious matter, (1) in a manner of automatic target recognition technique, (2) in a combination manner of the automatic target recognition technique and a privacy protection image; and (3) a combination manner of the (Continued)

automatic target recognition technique, a privacy protection image and human intervention.

14 Claims, 4 Drawing Sheets

(52) U.S. Cl.
CPC .............. *G06K 2209/09* (2013.01); *G06T 2207/30196* (2013.01); *G06T 2207/30232* (2013.01); *G07C 9/00158* (2013.01)

(56) References Cited

U.S. PATENT DOCUMENTS

| | | | |
|---|---|---|---|
| 2008/0212742 A1* | 9/2008 | Hughes .................. | 378/98.12 |
| 2009/0041293 A1 | 2/2009 | Andrew et al. ........... | 382/100 |
| 2012/0189165 A1* | 7/2012 | Sun et al. ................. | 382/103 |

OTHER PUBLICATIONS

Hongui Li; An algorithm for infrared image recognition based on Gabor wavelet and neural networks; Systems Engineering and Electronics; vol. 25 No. 2; 2003; contains Abstract; 4 p. 228-231.
"AIT: How it Works"; Transportation Security Administration; https://www.tsa.gov/ait-how-it-works; May 2013; accessed Oct. 23, 2014; 2 pages.
"Full Body Scanner"; Wikipedia; http://en.wikipedia.org/wiki/Full_body_scanner; Dec. 2015; accessed Jan. 5, 2016; 16 pages.
European Patent Application No. 14177714.4; Extended Search Report; dated Nov. 6, 2014; 12 pages.

\* cited by examiner

HUMAN BODY SECURITY INSPECTION METHOD AND SYSTEM

CROSS-REFERENCE TO RELATED APPLICATION

This application claims the benefit of Chinese Patent Application No. 201310311555.3 filed on Jul. 23, 2013 in the State Intellectual Property Office of China, the disclosure of which is incorporated herein by reference.

BACKGROUND OF THE INVENTION

1. Field of the Invention

The present invention generally relates to a technical field of human body security inspection, in particular to a human body security inspection method and the relevant system thereof.

2. Description of the Related Art

An automatic target recognition technique (ATR) is applied for the human body security inspection, so as to meet requirements of having a quick inspecting speed, a high efficiency and protecting individual privacy or the like, thereby improving competence of the products using this ATR technique. However, the ATR technique has the problem that the rate of false alarm is conflicted with the rate of missing alarm. Therefore, in the current human body security inspection, some locations with highest security levels demand an extremely low rate of missing alarm, however, it causes a high rate of false alarm which will result in a degraded inspection efficiency or the like.

In view of this, there indeed is a need to provide a relatively high efficient, safe and flexible human body security inspection method having the individual privacy protection function, and the corresponding human body security inspection system.

SUMMARY OF THE INVENTION

The present invention aims to solve at least one aspect of the above problems and drawbacks in the prior art.

In order to solve at least one problem as described above in the current human body security inspection, the present invention provides a new human body security inspection method, which employs the manner of combining a suspicious matter automatic target recognition technique, a privacy protection image and human-computer interaction, so as to perform the inspection. The operator can select the inspection method as required or as desired, and modify and/or confirm the automatically recognized result depending on the actual circumstance.

In the present invention, the selected inspection method can be any of the following three inspection modes:

(1) only the ATR technique is used, without displaying any image, and if the suspicious matter is present, then automatic alarm is given out.

(2) a combination of the ATR technique and the privacy protection image (for example puppet images or physical profile images) for achieving the privacy protection is used herein, and a suspected mark is automatically generated at a position of the privacy protection image, which corresponds to the position of the suspicious matter on the outline image.

(3) a combination of the ATR technique, the privacy protection image, and human intervention is used herein, and the remote operator may modify the automatic recognition result in accordance with the outline image (not limiting to the outline image, and the sort of the image can be chosen as required) displayed on the remote display, and delete, add the suspected mark and/or change its size and colour, as well as the privacy protection image with the suspected mark confirmed by the operator is displayed on the equipment end display.

In accordance with one aspect of the present invention, it provides a human body security inspection method, comprising the steps of:

retrieving in real-time scanning row or column image data of a personal to be inspected;

transmitting in real-time the image data to an algorithm processing module and processing these image data by the algorithm processing module;

automatically recognizing a suspicious matter by a suspicious matter automatic target recognition technique, after retrieving image data of an entire scanning image of the personal to be inspected; and giving a corresponding alarm based on the recognition result of the suspicious matter, without displaying any image of the personal to be inspected.

In an embodiment, the human body security inspection method further comprises:

after the scanning is finished, transmitting an entire original scanning image of the personal to be inspected to the algorithm processing module, so as to optimize the retrieved entire scanning image of the personal to be inspected.

In an embodiment, the human body security inspection method further comprises:

after retrieving in real-time scanning row or column image data of personal to be inspected, displaying in real-time a privacy protection image and an outline image of the personal to be inspected on an equipment end display and a remote operation end display in the human body security inspection system, respectively, based on the image obtained by processing the scanning row or column image data;

recognizing the suspicious matter on basis of the outline image by means of a suspicious matter automatic target recognition technique; and correspondingly displaying a suspected mark in the privacy protection image based on the suspicious matter recognized in the outline image.

In an embodiment, the suspected mark matched with the suspicious matter is correspondingly displayed on the privacy protection image, based on a sort of the recognized suspicious matter and its position and size in the outline image.

In an embodiment, the suspected mark is a suspected frame, and a colour of the suspected frame represents the sort of the suspected matter.

In an embodiment, a suspected blue frame represents a metal article, a suspected green frame represents a non-metal article, and a suspected red frame represents explosives or drugs.

In an embodiment, the privacy protection image is fully matched with an outline of the personal to be inspected, but does not contain detailed features of the personal to be inspected.

In an embodiment, the privacy protection image and the outline image of the personal to be inspected are simultaneously obtained from the original scanning image, by means of the algorithm processing module in the human body security inspection system.

In an embodiment, the physical profile image is obtained by removing the detailed features of the personal to be inspected with algorithm of the algorithm processing module.

In an embodiment, during the removing step, mending and removing roughness of edges of the privacy protection image and/or holes in an interior of the privacy protection image caused by presence of the suspicious matter by means of the algorithm.

In an embodiment, the outline image is obtained by performing denoising and contour extracting process on the original scanning image.

In an embodiment, a remote operator performs a modifying operation of the suspicious matter on the outline image displayed on the remote operation end display, and confirms and submits the modifying operation;

it is determined whether an alarm should be given in accordance with a result after operation of the operator, and the modified suspected mark which is matched with the suspicious matter is correspondingly displayed on the privacy protection image.

In an embodiment, the modifying operation comprises any one of addition of the suspected mark, deletion of the suspected mark, change of its size and change of its colour, or any combination thereof, and the privacy protection image is a puppet image or a physical profile image.

In accordance with another aspect of the present invention, it provides a human body security inspection system, which performs an inspection in a manner of combining a suspicious matter automatic target recognition technique, a privacy protection image and human-computer interaction during the human body security inspection, comprising:

an image retrieving device for retrieving scanning images of a personal to be inspected within a scanning region;

an automatic recognition device for implementing a suspicious matter automatic target recognition technique;

a human-computer interaction device for implementing a human-computer interaction operation;

a generating device for generating an outline image, a privacy protection image and a suspected mark of the recognized suspicious matter;

a warning device for giving an alarm whether the suspicious matter is present or not; and a device for displaying the privacy protection image and the outline image on an equipment end display and a remote operation end display of the human body security inspection system respectively in a form of split-display.

In an embodiment, the human body security inspection system is capable of performing any of the following inspection modes based on selection of a remote operator on the human-computer interaction device for implementing the human-computer interaction:

(1) determining whether to give an alarm that the suspicious matter is present or not, without displaying any image, directly from an automatic recognition result of the suspicious matter;

(2) using the split-display technique to display the privacy protection image and the outline image on the equipment end display and the remote operation end display of the human body security inspection system respectively, and determining whether to give an alarm from the automatic recognition result of the suspicious matter and showing the suspicious matter in a form of a suspected mark respectively in the privacy protection image and the outline image;

(3) using the split-display technique to display the privacy protection image and the outline image on the equipment end display and the remote operation end display of the human body security inspection system respectively, and showing the suspicious matter on the privacy protection image and the outline image in a form of a suspected mark, performing the modifying operation of the suspected mark on the outline image by a remote operator and confirming to submit this modifying operation, determining whether to give an alarm from the result obtained by the operation of the operator, and displaying the modified suspected mark on the privacy protection image.

In an embodiment, the suspected mark is a suspected frame, and the modifying operation comprises any one of addition of the suspected mark, deletion of the suspected frame, change of its size and change of its colour, or any combination thereof.

In an embodiment, a display on a scanning apparatus of the human body security inspection system is the equipment end display, and the privacy protection image displayed on the equipment end display is matched with the outline image displayed on the remote operation end display, if the suspected mark on the outline image is modified, then a suspected mark on the privacy protection image displayed on the equipment end display is automatically modified so as to match to the suspected mark of the outline image.

In accordance with yet another aspect of the present invention, it provides a human body security inspection method, comprising the steps of:

retrieving in real-time scanning row or column image data of a personal to be inspected;

transmitting in real-time the image data to an algorithm processing module and processing these data by the algorithm processing module;

automatically recognizing a suspicious matter by a suspicious matter automatic target recognition technique, after retrieving an image data of an entire scanning image of the personal to be inspected;

any of the following three inspection modes is selected based on the selection of a remote operator, so as to perform a further processing on basis of the recognition result of the suspicious matter, (1) determining whether to give an alarm that the suspicious matter is present or not, without displaying any image, directly from an automatic recognition result of the suspicious matter;

(2) using the split-display technique to display the privacy protection image and the outline image on the equipment end display and the remote operation end display of the human body security inspection system respectively, and determining whether to give an alarm from the automatic recognition result of the suspicious matter and showing the suspicious matter in a form of a suspected mark in the privacy protection image and the outline image respectively;

(3) using the split-display technique to display the privacy protection image and the outline image on the equipment end display and the remote operation end display of the human body security inspection system respectively, and showing the suspicious matter on the privacy protection image and the outline image in a form of a suspected mark, performing the modifying operation of the suspected mark on the outline image by the remote operator and confirming to submit this modifying operation, determining whether to give an alarm from the results by the operation of the operator, and displaying the modified suspected mark on the privacy protection image.

It can be known from the above that the human body security inspection method and the human body security inspection system of the present invention can employ or implement a new inspection mode (a manner of combining the suspicious matter automatic target recognition technique, the privacy protection image and the human-computer interaction). This enables the user to choose the most appropriate inspection method, and the human-computer interaction can improve the safety and flexibility of the resulting inspection results and the adaptability of the product of the human body inspection.

BRIEF DESCRIPTION OF THE DRAWINGS

These and other aspects as well as advantages of the present invention will become apparent and readily understood from the description of the preferred embodiments taking in conjunction with the accompanying drawings, in which like reference numerals represent like components.

DETAILED DESCRIPTION OF THE EMBODIMENTS

Figure 1:
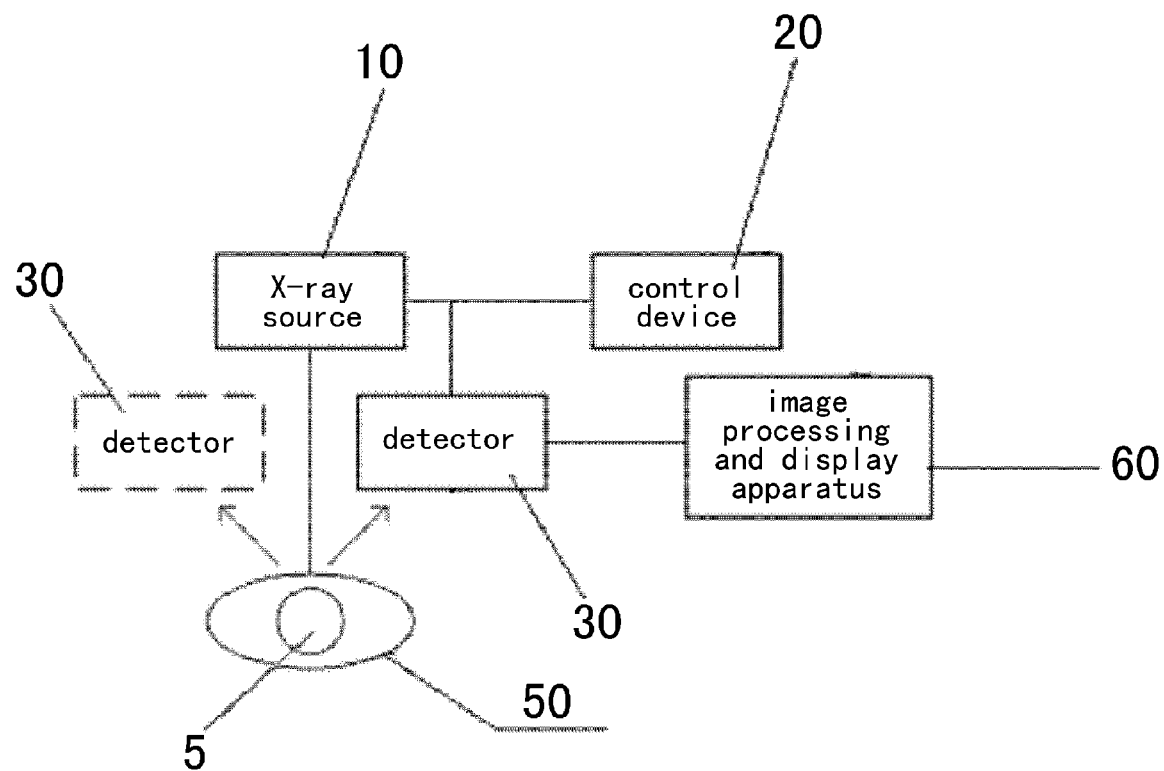
FIG. 1 shows a schematic view of a human body back-scatter scanning system in accordance with an embodiment of the present invention.

Technical solutions of the present invention will be described hereinafter in more detail by the way of embodiment with reference to FIGS. 1-4 of the attached drawings, wherein the same or like reference numerals refer to the same or like elements throughout the specification. The explanation to the embodiment of the present invention with reference to the accompanying drawings is intended to interpret the general inventive concept of the present invention, rather than being construed as a limiting to the present invention.

The specific embodiments of the present invention will be described in detail below. It should be noted that embodiments described herein are depicted only for illustration, instead of limiting to the present invention. In order to understand the present invention comprehensively, a number of specific details are provided in the following description. However, it is obvious for those skilled in the art not to implement the present invention exactly by the specific details. In other embodiments, the well-known structures, materials and methods are not specifically described herein, in order to avoid obscuring the present invention.

Throughout the description of the present invention, a reference to "one embodiment", "an embodiment", "one example" or "an example" is meant that the specific features, structures, or characteristics described in a combination with this embodiment or example are incorporated into at least one embodiment of the present invention. Therefore, phrases "in one embodiment", "in an embodiment", "in one example", or "in the example" present in the description of the present invention does not means the same embodiment or the same example. In addition, it is possible to combine the specific features, structures or characteristics into one or more embodiments or examples, in any suitable combination and/or sub-combination. Furthermore, the ordinary person skilled in the art should appreciate that the expression "and/or" used herein includes any combination or all combinations of one or more relevant items listed herein.

Since in the prior art it is impossible to freely select the human body security inspection modes and/or to adopt the desired human body security inspection mode in different occasions or circumstances as required, some embodiments of the present invention provide a human body security inspection method and the relevant system for solving this problem.

In an embodiment of the present invention, it provides a novel human body security inspection method, which performs inspection by a combination of a suspicious matter automatic target recognition technique, a privacy protection image and human-computer interaction. Operators can choose the inspection method as required or desired, and can modify and/or confirm the results of the automatic recognition based on the practical situation.

In embodiments of the present invention, the inspection method can be selected from any of the following three inspection modes:

I. only the automatic target recognition technique (ATR) is used, wherein no images are displayed. It would automatically give an alarm, when a suspicious matter is present.

II. a combination of the automatic target recognition technique and the privacy protection image (for example, puppet image or physical profile image) for achieving the purpose of privacy protection is adopted, wherein suspicious marks are automatically generated at positions of the privacy protection image corresponding to the positions of the suspicious matters on the outline image.

III. a combination of the automatic target recognition technique, the privacy protection image and human intervention is adopted, and a remote operator can modify the results of the automatic recognition in accordance with the outline image (it is not limited to the outline image, and different types of the images can be selected as required) displayed on the remote display. The operators can delete and add the suspicious marks, as well as change their sizes and colors. Finally, the privacy protection image with the suspicious frames which are confirmed by the operator, is displayed on the equipment end display.

In the human body security inspection of the present invention, the method of obtaining the scanning images of the personal to be inspected can be achieved by using the human body back-scatter scanning system (as described herein below). Of course, it can be understood that the scanning of the images is not limited to row scanning or column scanning, which can be chosen by the person skilled in the art as required.

FIG. 1 shows a schematic view of the human body back-scatter scanning system in accordance with an embodiment of the present invention. As shown in FIG. 1, the human body back-scatter scanning system includes a X-ray source 10, a detector 30, a control device 20 and an image processing and display apparatus 60. The control device 20 controls the X-ray source 10 to emit X-rays. By means of modulation by a flying spot forming device (not shown), flying spots are generated to scan a body surface of the personal to be inspected or the human body 5 within an inspection region 50, and the control device 20 controls the detector 30 to detect the X-rays scattered by the inspected human body, thereby forming a back-scatter image. In this way, if it is necessary to scan several sides of the human body, then it is possible to obtain the back-scatter images of the sides of the human body after such scanning as described above. Then, the back-scatter image(s) of one side or more sides of the inspected human body is/are processed within the image processing and display apparatus 60, for instance by a software.

Figure 2:
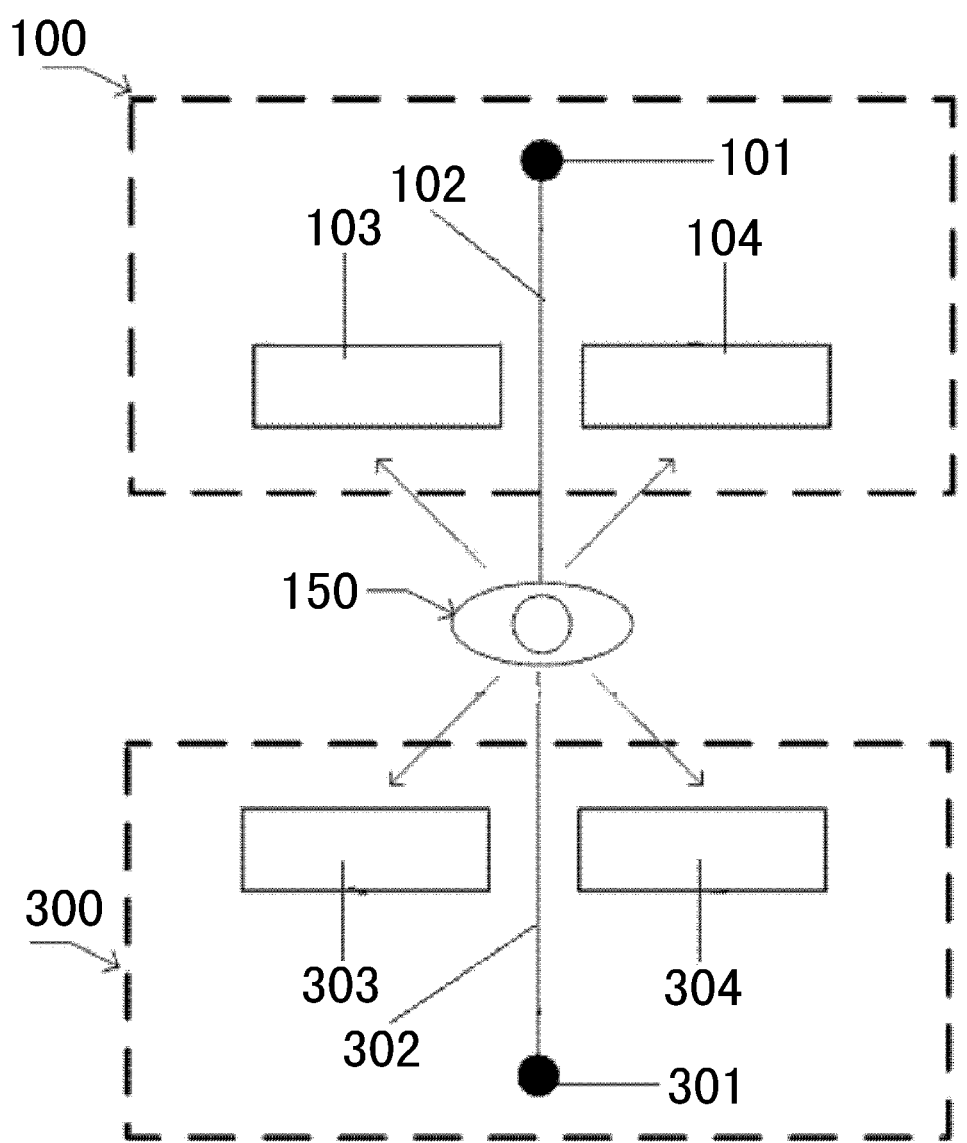
FIG. 2 shows a schematic view of a human body back-scatter scanning system in accordance with another embodiment of the present invention.

FIG. 2 shows a schematic view of another human body back-scatter scanning system for obtaining back-scatter images in accordance with another embodiment of the present invention. As shown in FIG. 2, the apparatuses 100 and 300 are two back-scatter apparatuses, each of which utilizes a flying spot forming device as described in a Chinese Patent application No. 201010624252.3 (with a publication number of CN102565110A). The detector therein includes two back-scatter detectors. The detector does not need to translate right and left, and the personal to be inspected 5 (for instance a circle in the inspection region of FIG. 2) stands within the inspection region 150. At the same time, ray beams 102 which are emitted from the X-ray source 101 of the apparatus 100, are radiated onto the personal to be inspected (for example a front side thereof) and then the scattered rays are received by the detectors 103 and 104. Meanwhile, ray beams 302 which are emitted from the x-ray source 301 of the apparatus 300, are radiated onto the personal to be inspected (for example a back side thereof) and then the scattered rays are received by the detectors 303 and 304. In this way, it is at least capable of obtaining the back-scatter images of two sides of the personal to be inspected at the same time.

Of course, it is also possible to dispose the above apparatuses 100 and 300 shifted from each other by a certain distance, that is, the apparatuses 100 and 300 are not fully in opposite to each other. For example, the apparatus 300 can be translated to the right along a horizontal direction of FIG. 2 by a certain distance. In this case, the personal to be inspected can stand onto a conveyer belt (not shown), so as to move from the inspection region 150 of the apparatus 100 to the inspection region of the apparatus 300. When the personal to be inspected is located within the scanning range of the apparatus 100, the ray source 101 of the apparatus 100 emits the ray beams 102, and they illuminate the personal to be inspected. Finally, the scattered rays are received by the detectors 103 and 104.

When the personal to be inspected is transferred to an area within the scanning range of the apparatus 300, the ray source 301 of the apparatus 300 emits the rays, and then they are radiated onto the personal to be inspected. The scattered rays are received by the detectors 303 and 304. After the personal to be inspected is transferred out of the scanning range of the apparatus 300 by means of the conveyor belt, the scanning of the human body is finished. In this way, it is not only possible to rapidly obtain the back-scatter images of several sides of the personal to be inspected, but also to avoid the interferences caused when the apparatuses 100 and 300 as arranged in FIG. 2 of the present invention simultaneously perform the inspection, thereby improving the inspection accuracy of the apparatuses.

In accordance with other embodiments of the present invention, the human body back-scatter scanning system also can use a camera, so as to rapidly retrieve optical images of the personal to be inspected. These optical images are used to determine the outline information of the personal to be inspected.

It can be known from the above that the scanning images of the personal to be inspected can be obtained by, for example, the back-scatter technique as known in the art. Of course, the scanning images of the present invention also can be obtained by other imaging techniques such as millimeter wave, X-ray and the like, but not limiting to the back-scatter imaging technique of the present invention.

Figure 3:
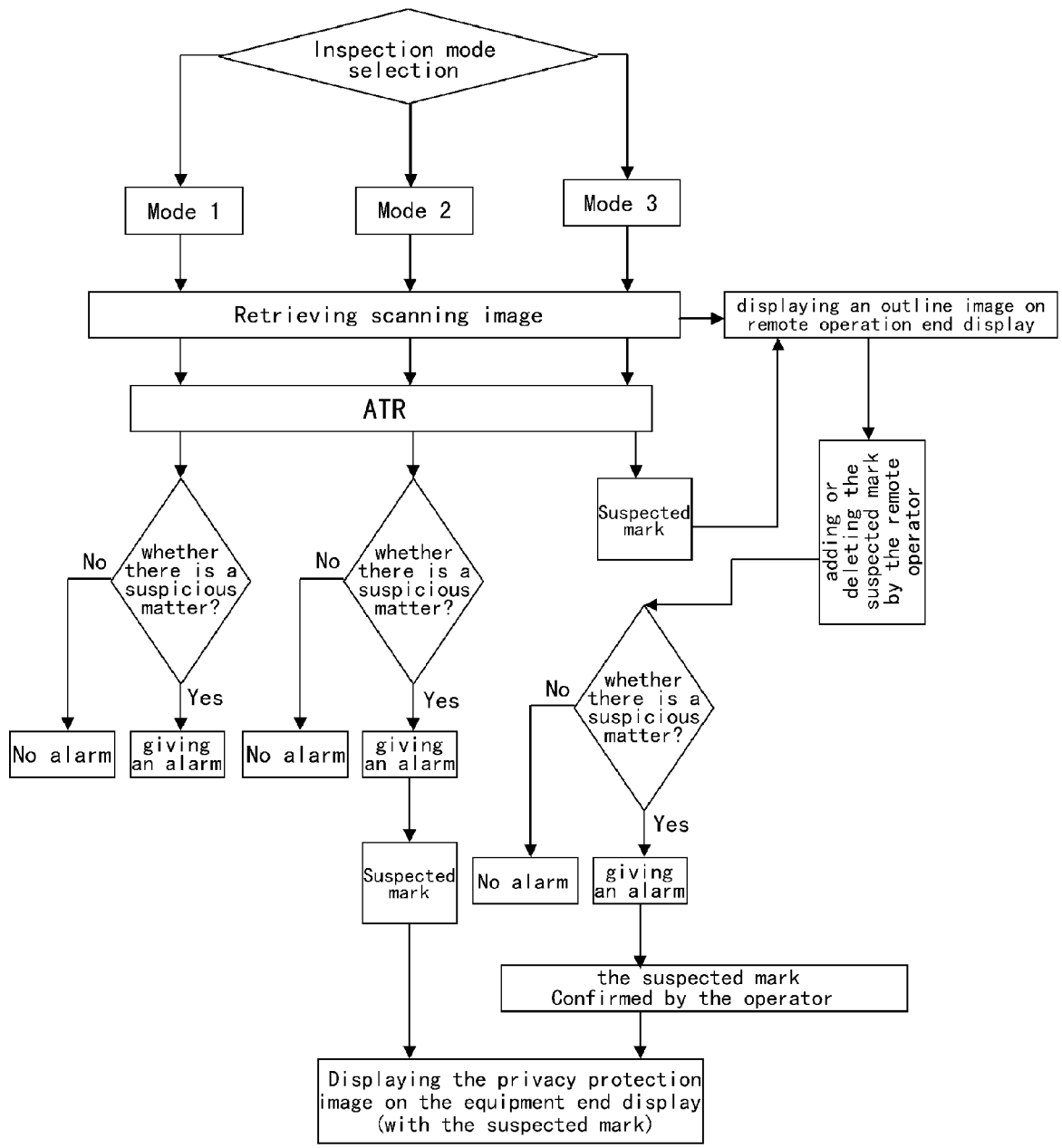
FIG. 3 shows a flowchart of an inspection method for inspecting human body security in accordance with an embodiment of the present invention.

With reference to FIG. 3, it shows a flowchart of the human body inspection method in accordance with an embodiment of the present invention.

Firstly, the operator can select any of the above described three inspection modes as a default inspection mode to inspect the human body, by means of a software operation interface of the human body security inspection system. After that, the human body security inspection system will inspect in accordance the default mode, until the reselection is done.

Specifically, as shown in FIG. 3, when selecting the first mode from the three inspection modes, for example, the back-scatter scanning system as shown in FIG. 1 or 2 scans the personal to be inspected which is located within in the inspection region, so that scanning line or scanning column image data of the personal to be inspected can be obtained in real time. During the image scanning, the image data are in real-time transmitted to an algorithm processing module, and then the algorithm processing module performs the corresponding processing (for example with any algorithm known in the prior art), so that it is possible to in real-time obtain the privacy protection image and/or the outline image of the personal to be inspected, on basis of the scanning images obtained after processing the scanning line or column image data. In one preferred embodiment of the present invention, after the scanning of the personal to be inspected is completed, the entire originally scanning image of the personal to be inspected is transmitted to the algorithm processing module, so as to optimize an entire scanning image of the personal to be inspected. The optimized physical profile image and the outline image can be displayed respectively on the equipment end display and the remote operation end display of the human body security inspection system.

Then, after retrieving the data of the entire scanning image of the personal to be inspected, the suspicious matter is automatically recognized by the suspicious matter automatic target recognition technique; and it will give a corresponding alarm based on the automatic recognition results of the suspicious matter, without displaying any image of the personal to be inspected. Specifically, as shown, it will give a warning signal, if the automatic recognition result shows the inspected personal carries the suspicious matter; and in contrast, it would not give a warning signal, if the automatic recognition result does not show the inspected personal carries the suspicious matter.

When the operator selects the second mode from the three inspection modes:

Besides retrieving in real-time the scanning line or column image data of the inspected personal in the same manner as described above, the privacy protection image and the outline image of the inspected personal are in real-time displayed on basis of the processed image of the scanning line or column image data, after the retrieving step. Herein, the privacy protection image can be a physical profile image of the inspected personal, but it also can be other types of images having the privacy protection function, such as puppet images. In addition, the outline image also can be other images which can show detailed features of the inspected personal.

After retrieving the corresponding physical profile image and the outline image, the physical profile image is transmitted to the equipment end display of the corresponding human body security inspection system for being displayed and the outline image of the inspected personal is displayed on the remote operation end display of the human body security inspection system at the same time.

The automatic recognition device which is capable of automatically recognizing the suspicious matter by the ATR technique in the human body security inspection system, recognizes the suspicious matter in the same manner as that used in the first mode, and determines whether an alarm should be given or not, based on the automatic recognition result.

Correspondingly, when the automatic recognition result shows the inspected personal carrying the suspicious matter, the algorithm processing module makes a suspected mark on the outline image displayed on the remote operation end display for example in a form of a suspected frame. In accordance with this suspected mark, the privacy protection image with the suspected mark matched to that on the outline image is displayed on the equipment end display by the algorithm processing module.

When the operator selects the third mode from the three inspection modes:

Besides retrieving in real-time the scanning line or column image data of the inspected personal in the same manner as described above, the privacy protection image and the outline image of the inspected personal are in real-time displayed on basis of the image obtained by processing the scanning line or column image data, after the retrieving step. Herein, the privacy protection image can be a physical profile image of the inspected personal, but it also can be other types of images having the privacy protection function, such as puppet images. In addition, the outline image also can be other images which can show detailed features of the inspected personal.

After retrieving the corresponding physical profile image and the outline image, the physical profile image is transmitted to the equipment end display of the corresponding human body security inspection system for display and the outline image of the inspected personal is displayed on the remote operation end display of the human body security inspection system at the same time.

The automatic recognition device which is capable of automatically recognizing the suspicious matter by the ATR technique in the human body security inspection system, recognizes the suspicious matter in the same manner as that used in the first mode.

Correspondingly, when the automatic recognition result shows the inspected personal carrying the suspicious matter, the algorithm processing module makes a suspected mark on the outline image displayed on the remote operation end display for example in a form of a suspected frame.

After that, the remote operator can modify the suspected mark of the outline image displayed on the remote operation end display independently or as required (for example, it is necessary to further confirm the location for carrying the suspicious matter, the location carrying the suspicious matter, the size or sorts of the suspicious matter has been manually confirmed), in accordance with the displayed suspected mark. The modifying operation includes addition and deletion of the displayed mark, change of its size and colour (as described below, the colour can indicate different sorts of the suspicious matter).

Then, an alarm device in the human body security inspection system will determine whether an alarm should be given or not based on the results after the operation of the operator, by means of the automatic recognition device. If it is confirmed that the suspicious matter is present, then an alarm is sent out. At the same time, in accordance with the suspected mark after the confirmation of the operator, the privacy protection image with the suspected mark matched to that of the outline image is displayed on the equipment end display by the algorithm processing module.

It should be noted that a split-display technique is applied into both the second inspection mode and the third inspection mode. In this way, the second and third inspection modes have good privacy protection function, because only the physical profile image fully matching with the personal to be inspected is displayed on the equipment end display, and does not contain any detailed features, and only a suspected frame is displayed at the position where the suspicious matter is present. Specifically, the privacy protection image is merely displayed on the display of the scanning apparatus (i.e., the equipment end display), while the corresponding outline image is displayed on the remote operation end display. Furthermore, the suspected marks in the images respectively on the display of the scanning apparatus and the remote operation end display are matched with each other. If the suspected mark is modified on the outline image, then the suspected mark on the privacy protection image will be accordingly modified.

The specific contents as mentioned in the first to third inspection modes of the human body security inspection of the present invention will be explained in more detail below.

The physical profile image is an image having the privacy protection function, that is, any feature information about the personal to be inspected is comprised. The outline image includes the feature information of the inspected personal.

In accordance with the recognition result of the suspicious matter, a suspected frame corresponding to the size of the suspicious matter is marked at the position of the suspicious matter. The colour of the suspected frame indicates the sort of the suspicious matter. For example, a blue frame is used to represent a metal article, a green frame is used to represent a non-metal article, and a red frame is used to represent explosives or drugs. Of course, the colour of the suspected frame can be arbitrarily chosen, so as to represent the desired sort of the suspicious matter. The same suspected frame is displayed at the corresponding position of the physical profile image. The recognition method of the suspicious matter can be performed by the ATR method or other recognition methods well known in the art. The ATR method can be found from a published article of Jun H E et al. entitled "Interval estimation and sample size calculation for ATR algorithm classification accuracy" (systems engineering and electronics, No. 7 of Vol. 29, July 2007) and another article of Honggui Li entitled "An algorithm for infrared image recognition based on Gabor wavelet and neural network" (systems engineering and electronics, No. 2 of Vol. 25, 2003).

Specifically, the ATR method can be a pattern recognition method using the neural network. In the embodiment of the present invention, the ATR method includes the steps of: (a) image denoise and enhancement, wherein a wavelet denoise and enhancement method is used on basis of edge-preserving, and the information of the edge is kept as possible as it can upon smoothing the image; (b) dividing image, wherein the image is divided into several typical regions (such as, head, chest, arms and legs); (c) extracting sample features wherein the feature information such as texture (gray level co-occurrence matrix), and Nth order matrix is used as input parameters of the neural network; (d) training and recognizing of the samples, wherein the parameters of the neural network are trained by the samples, another group of samples are used to perform recognizing operation; and (e) analyzing the warned region, wherein the suspicious matter is split out from the warned region by an image segmentation algorithm.

In an embodiment of the present invention, a generation method of obtaining the physical profile image having the privacy protection function by processing the scanning image with the algorithm processing module includes the steps: (a) filtering, specifically, morphology filtering and smoothing the noise points; (b) binary image; and (c) hole-filling, specifically morphology hole-filling algorithm, to fill the holes caused by the suspicious matter within the human body.

In the process for performing the algorithm of the algorithm processing module, initially original scanning image typically has various detail information (for example, the human body privacy information and the suspicious matter information), and the two images (i.e., the physical profile image and the outline image) can be obtained by processing the original scanning images. The physical profile image is obtained by removing the detailed information of the human body with the algorithm. During the removing process, the edges of the image become rough and holes is present in the interior of the image due to the existence of the suspicious matter. The roughness and interior holes can be eliminated by correcting the image by the above described algorithm (for example, hole-filling). The outline image (not limiting to the outline image) is obtained by reprocessing the original image that has been processed for denoising and contour extraction.

It should be noted that the above described suspicious matter recognition method and the algorithm of obtaining the physical profile image and the outline image can be performed by other methods known in the art. It is not necessary to limit to the above disclosed method.

Figure 4:
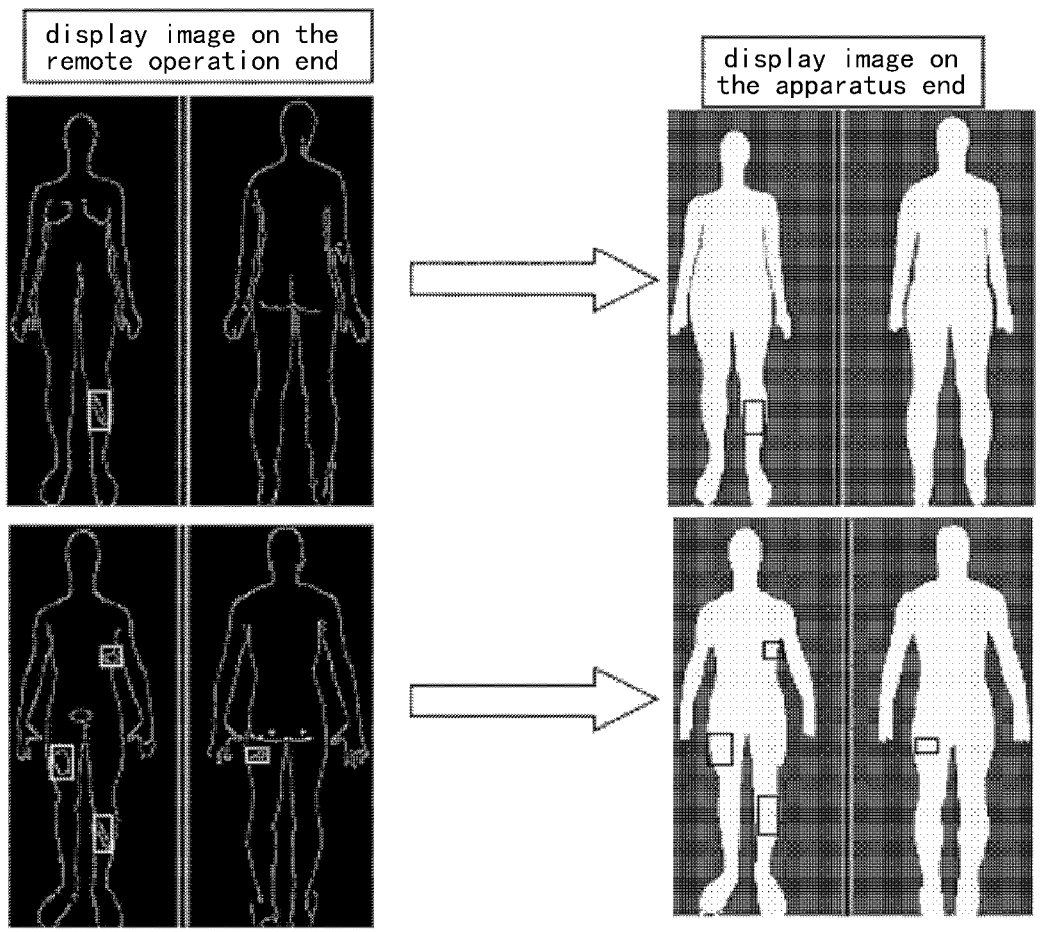
FIG. 4 shows a physical profile image and an outline image of a personal to be inspected displayed on a remote operation end display and an equipment end display, which are obtained from the human body security inspection method in accordance with an embodiment of the present invention.

With reference to FIG. 4, finally, after the physical profile image and the outline image with the suspected frame respectively are acquired, they are displayed by a split-display technique. The physical profile image is displayed on the display (i.e., the equipment end display) carried by the human body security inspection system or the back-scatter scanning system; and the outline image is displayed on the remote operation end display. Specifically, it can be seen from the outline image at the left side of FIG. 4, some detailed features of the personal to be inspected; in contrast, it is only possible to see the physical profile image matched to the personal to be inspected from the physical profile image at the right side of FIG. 4.

After finishing one inspection, the original scanning image and the outline image or the like are deleted, while only the physical profile image with the suspected frame is saved.

In an embodiment of the present invention, the physical profile image with the suspected frame is obtained by processing the original scanning image with the techniques such as the image processing, image recognition and so on; the physical profile image and the outline image (not limiting to the outline image) are respectively displayed on the equipment end display and the remote operation end display by the software split-display technique. The remote operator can see the outline image (not limiting to the outline image), but cannot see the personal to be inspected. The workers at the equipment end and the personal to be inspected only can see the physical profile image, while the image with the privacy features is not saved. In this way, the privacy can be very well protected, while achieving the accurately positioning of the suspicious matter and the distinguishing of its sort. The present disclosure achieves the privacy protection function in the human body security inspection by the technical means such as the image processing, the image recognition and the split-display technique. The physical profile image fully matching with the original image and excluding any detailed features of the human body can be generated via the image processing of the original scanning images obtained by the scanning in the second and third inspection modes. Therefore, the suspicious matter can be accurately positioned, and the advantages such as rapid and stable algorithm or the like can be obtained.

Accordingly, the present disclosure also provides a human body security inspection system, which performs an inspection in a manner of combining the suspicious matter automatic target recognition technique, the privacy protection image and the human-computer interaction during the human body security inspection. The human body security inspection system includes: an image retrieving device for retrieving scanning images of a personal to be inspected within a scanning region; an automatic recognition device for implementing a suspicious matter automatic target recognition technique; a human-computer interaction device for implementing a human-computer interaction operation; a device for generating an outline image, a privacy protection image and a recognition mark of the suspicious matter; a warning device for giving an alarm whether the suspicious matter is present or not; a device for respectively displaying the privacy protection image and the outline image on an equipment end display and a remote operation end display of the human body security inspection system.

The human body security inspection system can perform any of the following inspection modes based on the selection of the remote operator on the human-computer interaction device for implementing the human-computer interaction, as shown in FIG. 3.

(1) determining whether to give an alarm that the suspicious matter is present or not, without displaying any image, directly from an automatic recognition result of the suspicious matter;

(2) using the split-display technique to display the privacy protection image on the equipment end display of the human body security inspection system and to display the outline image on the remote operation end display of the human body security inspection system, and determining whether to give an alarm from the automatic recognition result of the suspicious matter and showing the suspicious matter in a form of a suspected mark respectively in the privacy protection image and the outline image;

(3) using the split-display technique to display the privacy protection image on the equipment end display of the human body security inspection system and to display the outline image on the remote operation end display of the human body security inspection system, and showing the suspicious matter on the privacy protection image and the outline image in a form of a suspected mark, performing the modifying operation of the suspected mark on the outline image by the remote operator and confirming to submit this modifying operation, determining whether to give an alarm from the results after the operation of the operator, and displaying the modified suspected mark on the privacy protection image.

The suspected mark can be a suspected frame, and the modifying operation can be any of the addition and deletion of the suspected frame, changing its size and/or colour, and any combination thereof.

It can be seen from the above that the embodiment of the present invention provides three inspection modes for users. The user can select the most appropriate inspection mode as desired. The human-computer interaction function can enable the resulting inspection result to be more safe and flexible, so that the human body security inspection method and the human body security inspection system become more adaptive.

The embodiments of the method and apparatus for three dimension enhanced image quality of back-scatter images have been discussed in detail through the schematic views, flowcharts and/or examples in the above detailed description. In the case that such schematic views, flowcharts and/or examples include one or more functions and/or operations, the skilled person in the art should appreciate that each function and/or operation in the schematic views, flowcharts and/or examples can be implemented separately or in combination, by various structures, hardware, software, firmware or any combination thereof. In one embodiment of the present invention, a plurality of parts of the subject matter in accordance with the embodiment of the present invention can be implemented by ASIC, FPGA, DSP or other integration forms. However, the skilled person in the art should understand that some methods of the embodiments as disclosed herein can be entirely or partly be implemented in the integration circuit as well, as one or more computer programs performed on one or more computers (for example, one or more computer programs performed on one or more computer systems), one or more computer programs performed on one or more processors (for example one or more computer programs performed on one or more microprocessors), a firmware, or any combination thereof. Furthermore, the skilled person in the art can possess the ability of designing the circuit and/or writing the software and/or the firmware code, in accordance with the present disclosure. In addition, the skilled person in the art can appreciate that the mechanism of the body of the present disclosure can be distributed as a plurality of forms of program products, and no matter how the specific types of the signal carrying medium for performing the distribution for the actual usage, the illustrative embodiment of the body of the present disclosure can be used herein. The examples of the signal carrying medium include, but not limiting to: recordable medium (for example floppy disk), hardware driver, CD, DVD, digital magnetic tape, computer storage or the like, and the transmission medium (for example digital and/or analogy communicating medium (for example, optical fibre cable, waveguide, wired communication link, wireless communication link, and so on)).

Although the present invention has been explained with reference to the drawings, the embodiments shown in the drawings are only illustrative, instead of limiting the present invention. Although some embodiments of the general inventive concept are illustrated and explained, it would be appreciated by those skilled in the art that modifications and variations may be made in these embodiments without departing from the principles and spirit of the general inventive concept of the disclosure, the scope of which is defined in the appended claims and their equivalents.

What the claims is:

1. A human body security inspection method, comprising the steps of:
   retrieving in real-time scanning row or column image data of a personal to be inspected;
   transmitting in real-time the image data to an algorithm processing module and processing these image data by the algorithm processing module;
   automatically recognizing a suspicious matter by a suspicious matter automatic target recognition technique, after retrieving image data of an entire scanning image of the personal to be inspected, wherein any one of the following three inspection modes is selected based on the selection of a remote operator, so as to perform a further processing on basis of the recognition result of the suspicious matter,
   (1) determining whether to give an alarm that the suspicious matter is present or not, without displaying any image, directly from an automatic recognition result of the suspicious matter;
   (2) using a split-display technique to display a privacy protection image of the personal to be inspected and an outline image of the personal to be inspected on an equipment end display and a remote operation end display of the human body security inspection system respectively, and determining whether to give an alarm from the automatic recognition result of the suspicious matter and showing the suspicious matter in a form of a suspected mark in the privacy protection image and the outline image respectively;
   (3) using the split-display technique to display the privacy protection image and the outline image on the equipment end display and the remote operation end display of the human body security inspection system respectively, and showing the suspicious matter on the privacy protection image and the outline image in a form of a suspected mark,
   performing a modifying operation of the suspected mark on the outline image by the remote operator and confirming to submit this modifying operation,
   determining whether to give an alarm from the results by the operation of the operator, and displaying the modified suspected mark on the privacy protection image.

2. The human body security inspection method of claim 1, wherein
   the suspected mark matched with the suspicious matter is correspondingly displayed on the privacy protection image, based on a sort of the recognized suspicious matter and its position and size in the outline image.

3. The human body security inspection method of claim 2, wherein
   the suspected mark is a suspected frame, and a colour of the suspected frame represents the sort of the suspected matter.

4. The human body security inspection method of claim 3, wherein
   a suspected blue frame represents a metal article, a suspected green frame represents a non-metal article, and a suspected red frame represents explosives or drugs.

5. The human body security inspection method of claim 4, wherein
   the privacy protection image is fully matched with an outline of the personal to be inspected, but does not contain detailed features of the personal to be inspected.

6. The human body security inspection method of claim 5, wherein
   the privacy protection image and the outline image of the personal to be inspected are simultaneously obtained from the original scanning image, by means of the algorithm processing module in the human body security inspection system.

7. The human body security inspection method of claim 6, wherein
   the physical profile image is obtained by removing the detailed features of the personal to be inspected with algorithm of the algorithm processing module.

8. The human body security inspection method of claim 7, wherein during the removing step, mending and removing roughness of edges of the privacy protection image and/or holes in an interior of the privacy protection image caused by presence of the suspicious matter, by means of the algorithm.

9. The human body security inspection method of claim 6, wherein the outline image is obtained by performing denoising and contour extracting process on the original scanning image.

10. The human body security inspection method of claim 1, wherein the modifying operation comprises any one of addition of the suspected mark, deletion of the suspected mark, change of its size and change of its colour, or any combination thereof, and the privacy protection image is a puppet image or a physical profile image.

11. A human body security inspection system, comprising:

at least a processor;
at least a memory communicatively coupled to the at least processor and bearing instructions that upon execution by the at least processor cause the system at least to:
retrieve scanning images of a personal to be inspected within a scanning region,
identify a suspect matter by implementing an automatic target recognition technique,
send an alarm in response to an identification of the suspect matter,
generate an outline image, a privacy protection image, and a mark indicative of the suspect matter, and
display the privacy protection image and the outline image on an equipment end display device and a remote operation end display in a form of split-display.

12. The human body security inspection system of claim 11, wherein the at least a memory further bears instructions that upon execution by the at least a processor cause the system, in response to a selection from the human-computer interaction device, to perform any one of the following inspection modes:

(1) determining whether to give an alarm that the suspect matter is present or not, without displaying any image, directly from an automatic recognition result of the suspect matter;
(2) using the split-display technique to display the privacy protection image and the outline image on the equipment end display and the remote operation end display, determining whether to give an alarm from the automatic recognition result of the suspect matter, and showing the mark indicative of the suspect matter in the privacy protection image and the outline image, respectively; or
(3) using the split-display technique to display the privacy protection image and the outline image on the equipment end display and the remote operation end display and showing the mark indicative of the suspect matter on the privacy protection image and the outline image,
performing a modifying operation of the mark indicative of the suspect matter on the outline image and confirming to submit the modifying operation,
determining whether to give an alarm from a result obtained by the modifying operation, and displaying a modified mark on the privacy protection image.

13. The human body security inspection system of claim 12, wherein the mark indicative of the suspect matter is a frame, and the modifying operation comprises any one of addition of the mark, deletion of the mark, change of its size and change of its colour, or any combination thereof.

14. The human body security inspection system of claim 12, wherein a display on a scanning apparatus of the human body security inspection system is the equipment end display, and the privacy protection image displayed on the equipment end display is matched with the outline image displayed on the remote operation end display,
if the mark indicative of the suspect matter on the outline image is modified, then the mark indicative of the suspect matter on the privacy protection image displayed on the equipment end display is automatically modified so as to match to the mark of the outline image.

* * * * *